I. GIBBS.

Stocks for Holding Cutters in Planing-Machines.

No. 5,329. Reissued March 18, 1873.

*Witnesses:*

Fred Haynes

David Morell

Ivers Gibbs per Wales, Brown & Allen

Attorneys

AM. PHOTO-LITHOGRAPHIC CO. N.Y. (OSBORNE'S PROCESS)

UNITED STATES PATENT OFFICE.

IVERS GIBBS, OF WORCESTER, MASSACHUSETTS.

IMPROVEMENT IN STOCKS FOR HOLDING CUTTERS IN PLANING-MACHINES.

Specification forming part of Letters Patent No. 20,999, dated July 27, 1858; extended seven years; reissue No. 5,329, dated March 18, 1873.

*To all whom it may concern:*

Be it known that I, IVERS GIBBS, of Worcester, in the county of Worcester and State of Massachusetts, have invented certain new and useful Improvements in Stock for Holding Cutters in Planing-Machines known as the "Daniels Planing-Machine; and I do hereby declare that the following is a full, clear, and exact description of the construction and operation of the same, reference being had to the accompanying drawing making a part of this description, in which—

Figure 1:
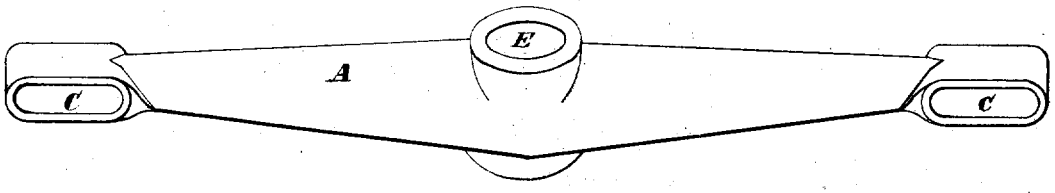
Figure 2:
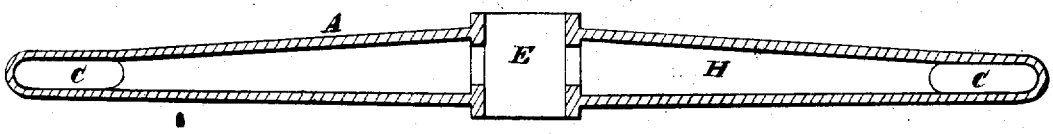
Figure 3:
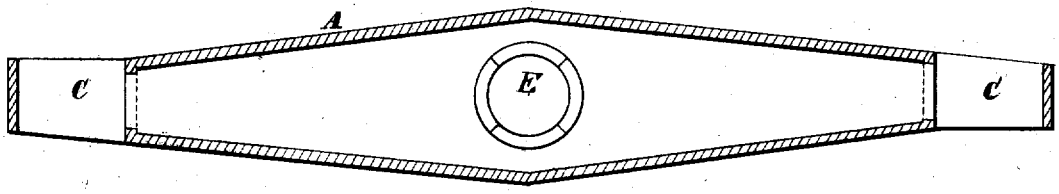
Figure 4:
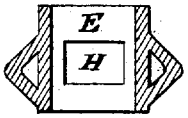

Figure 1 is a perspective view of an arm constructed according to my invention. Fig. 2 represents a central longitudinal vertical section of the same. Fig. 3 represents a horizontal section of the same. Fig. 4 represents a central vertical cross-section.

Similar letters of reference, where they occur in the separate figures, denote like parts of the arm in all of them.

The object of this invention is to obtain a planer-iron, which, while it shall possess the necessary strength and stiffness to enable it to run "still" or without tremor, shall be light and shall meet with but little resistance from the atmosphere in running at the highest required velocity; and to this end it consists in an arm having a transverse section, which presents the greatest thickness in the direction of the planes of its revolution, and the least thickness in plane perpendicular thereto, and having longitudinal cavities between its central hub and the sockets, provided at its ends for the reception of the planing-knives or cutters.

A is a bar, with a vertical hub or eye, E, at its center for the reception of the spindle or shaft of the planer, upon which it is fastened, and with a socket, C, at each end for the reception of the planing-knives or cutters. The transverse section of this arm is of a form which, though not necessarily a true oval, is commonly known in mechanics as oval or elliptical—that is to say, is broad in one direction and narrow or thin in the other, and rounded or beveled from its broader to its narrower sides, so that the latter present comparatively sharp or only slightly-rounded edges, the greatest breadth being in a direction parallel with the planes of revolution of the arm, so as to give the greatest stiffness in that direction, and the edges or narrow surfaces presenting themselves to the atmosphere in the revolution. This bar or arm is hollow—a cavity, H, extending from the hub or eye E to each of the knife or cutter sockets C, as shown in Fig. 2, the inside corresponding with the outside, as shown in Fig. 2, which renders it susceptible of being made exceedingly light and strong. The cavity extends entirely around the eye E, forming a sectional ring, as shown in Fig. 3, but on the outside the arm is complete, as seen in Fig. 1. This arm is made of what is commonly called "malleable cast-iron," and is constructed in the ordinary way of making different articles of that metal. Beside the lightness and strength obtained by constructing my planer-arm in this manner, it also offers but little resistance to the atmosphere when running; for in its operation it is simply fastened to the spindle, which is made to turn at any required speed.

Having thus fully described the nature and object of my invention, I would state that I am aware that many things have been wrought and cast hollow for the sake of strength and lightness. This I do not claim.

What I claim as new, and desire to secure by Letters Patent, is—

A planer-arm of the external form herein described, and having between its central hub and cutter-sockets longitudinal cavities, as and for the purpose herein set forth.

IVERS GIBBS.

Witnesses:

J. HENRY HILL,

J. B. KNOX.